(12) United States Patent
Ollenberger et al.

(10) Patent No.: US 9,400,959 B2
(45) Date of Patent: Jul. 26, 2016

(54) METHOD AND SYSTEM FOR DETECTING DUPLICATE TRAVEL PATH INFORMATION

(75) Inventors: Brian Jeffrey Ollenberger, Brentwood, CA (US); Lisa Anne Silveria, San Francisco, CA (US); Richard Thor Denmark, San Francisco, CA (US)

(73) Assignee: CONCUR TECHNOLOGIES, INC., Redmond, WA (US)

( * ) Notice: Subject to any disclaimer, the term of this patent is extended or adjusted under 35 U.S.C. 154(b) by 0 days.

(21) Appl. No.: 13/593,108

(22) Filed: Aug. 23, 2012

(65) Prior Publication Data

US 2013/0054542 A1 Feb. 28, 2013

Related U.S. Application Data

(60) Provisional application No. 61/529,680, filed on Aug. 31, 2011.

(51) Int. Cl.
*G06Q 40/00* (2012.01)
*G06Q 10/02* (2012.01)
*G06Q 10/04* (2012.01)

(52) U.S. Cl.
CPC ............ *G06Q 10/025* (2013.01); *G06Q 10/047* (2013.01)

(58) Field of Classification Search
CPC .......................... G06Q 10/025; G06Q 10/047
USPC ......................................................... 707/692
See application file for complete search history.

(56) References Cited

U.S. PATENT DOCUMENTS

| | | |
|---|---|---|
| 2,910,238 A | 10/1959 | Miles et al. |
| 2,995,729 A | 8/1961 | Steele |
| 3,253,262 A | 5/1966 | Wilenitz et al. |
| 4,755,963 A | 7/1988 | Denker et al. |
| 4,775,936 A | 10/1988 | Jung |
| 4,845,625 A | 7/1989 | Stannard |
| 4,857,840 A | 8/1989 | Lanchais |
| 4,862,357 A | 8/1989 | Ahlstrom et al. |
| 4,931,932 A | 6/1990 | Dalnekoff et al. |
| 5,021,953 A | 6/1991 | Webber et al. |
| 5,148,365 A | 9/1992 | Dembo |

(Continued)

FOREIGN PATENT DOCUMENTS

| | | |
|---|---|---|
| EP | 0762306 | 3/1997 |
| WO | WO 00/02152 | 1/2000 |
| WO | WO 01/61607 | 8/2001 |

OTHER PUBLICATIONS

Triplt, Flight Duplicates: Conflict Resolved, Sep. 13, 2010, Concur, 1 page.*

(Continued)

*Primary Examiner* — Apu Mofiz
*Assistant Examiner* — Dara J Glasser
(74) *Attorney, Agent, or Firm* — DLA Piper LLP US

(57) ABSTRACT

Methods and systems for detecting a likelihood that a travel path is a correct travel path of a user using possible duplicate travel path information. A set of travel paths comprising at least two travel paths is obtained. Any paths that break up more than one reservation are removed. Each travel path is broken into at least one leg. Each leg in each travel path is compared to each leg in every other travel path to determine whether any travel paths are duplicates. A likelihood that each of the at least two travel paths is the correct travel path is determined using information about whether any of the at least two travel paths are duplicates.

16 Claims, 14 Drawing Sheets

(56) References Cited

U.S. PATENT DOCUMENTS

| | | |
|---|---|---|
| 5,191,523 A | 3/1993 | Whitesage |
| 5,237,499 A | 8/1993 | Garback |
| 5,253,165 A | 10/1993 | Leiseca et al. |
| 5,253,166 A | 10/1993 | Dettelbach et al. |
| 5,255,184 A | 10/1993 | Hornick et al. |
| 5,270,921 A | 12/1993 | Hornick et al. |
| 5,272,638 A | 12/1993 | Martin et al. |
| 5,283,575 A | 2/1994 | Kao et al. |
| 5,331,546 A | 7/1994 | Webber et al. |
| 5,343,388 A | 8/1994 | Wedelin |
| 5,402,336 A | 3/1995 | Spiegelhoff et al. |
| 5,570,283 A | 10/1996 | Shoolery et al. |
| 5,623,413 A | 4/1997 | Matheson et al. |
| 5,644,721 A | 7/1997 | Chung et al. |
| 5,648,900 A | 7/1997 | Bowen et al. |
| 5,652,867 A | 7/1997 | Barlow et al. |
| 5,739,512 A | 4/1998 | Tognazzini |
| 5,802,492 A | 9/1998 | DeLorme et al. |
| 5,802,511 A | 9/1998 | Kouchi et al. |
| 5,832,451 A | 11/1998 | Flake et al. |
| 5,832,452 A | 11/1998 | Schneider et al. |
| 5,832,453 A | 11/1998 | O'Brien |
| 5,832,454 A | 11/1998 | Jafri et al. |
| 5,850,617 A | 12/1998 | Libby |
| 5,897,620 A | 4/1999 | Walker et al. |
| 5,899,981 A | 5/1999 | Taylor et al. |
| 5,948,040 A | 9/1999 | Delorme et al. |
| 6,009,408 A | 12/1999 | Buchanan |
| 6,023,679 A | 2/2000 | Acebo et al. |
| 6,029,144 A | 2/2000 | Barrett et al. |
| 6,085,169 A | 7/2000 | Walker et al. |
| 6,115,680 A | 9/2000 | Coffee et al. |
| 6,199,050 B1 | 3/2001 | Alaia et al. |
| 6,275,808 B1 | 8/2001 | DeMarcken |
| 6,295,521 B1 | 9/2001 | DeMarcken et al. |
| 6,298,328 B1 | 10/2001 | Healy et al. |
| 6,307,572 B1 | 10/2001 | Demarcken et al. |
| 6,336,097 B1 | 1/2002 | Scipioni |
| 6,360,205 B1 | 3/2002 | Iyengar et al. |
| 6,377,932 B1 | 4/2002 | DeMarcken |
| 6,381,578 B1 | 4/2002 | DeMarcken |
| 6,434,533 B1 | 8/2002 | Fitzgerald |
| 6,442,256 B1 | 8/2002 | Garland et al. |
| 6,442,526 B1 | 8/2002 | Vance |
| 6,446,048 B1 | 9/2002 | Wells et al. |
| 6,553,346 B1 | 4/2003 | Walker et al. |
| 6,609,098 B1 | 8/2003 | DeMarcken |
| 6,711,474 B1 | 3/2004 | Treyz et al. |
| 6,801,226 B1 | 10/2004 | Daughtrey |
| 6,826,473 B1 | 11/2004 | Burch et al. |
| 6,847,824 B1 | 1/2005 | Contractor |
| 6,868,400 B1 | 3/2005 | Sundaresan et al. |
| 7,050,986 B1 | 5/2006 | Vance et al. |
| 7,103,558 B1 * | 9/2006 | Patton et al. ............... 705/6 |
| 7,158,980 B2 | 1/2007 | Shen |
| 7,194,417 B1 * | 3/2007 | Jones ............... 705/5 |
| 7,249,041 B2 | 7/2007 | Last |
| 7,263,664 B1 | 8/2007 | Daughtrey |
| 7,277,923 B2 | 10/2007 | Rensin et al. |
| 7,328,166 B1 | 2/2008 | Geoghegan et al. |
| 7,330,110 B1 | 2/2008 | Heintzman et al. |
| 7,343,295 B2 | 3/2008 | Pomerance |
| 7,349,894 B2 | 3/2008 | Barth et al. |
| 7,366,682 B1 | 4/2008 | Katiyar et al. |
| 7,395,231 B2 | 7/2008 | Steury et al. |
| 7,409,643 B2 | 8/2008 | Daughtrey |
| 7,483,883 B2 | 1/2009 | Barth et al. |
| 7,493,261 B2 | 2/2009 | Chen et al. |
| 7,502,746 B2 | 3/2009 | Bertram et al. |
| 7,516,089 B1 | 4/2009 | Walker et al. |
| 7,539,620 B2 | 5/2009 | Winterton et al. |
| 7,548,615 B2 | 6/2009 | Bhalgat et al. |
| 7,555,387 B2 | 6/2009 | Sladky et al. |
| 7,746,510 B2 | 6/2010 | Pandipati |
| 7,949,579 B2 | 5/2011 | Keld |
| 8,009,334 B2 | 8/2011 | Pandipati |
| 8,195,194 B1 | 6/2012 | Tseng |
| 8,203,765 B2 | 6/2012 | Pandipati |
| 8,224,830 B2 | 7/2012 | Bidlack |
| 8,271,337 B1 | 9/2012 | Norins |
| 8,373,912 B2 | 2/2013 | Pandipati |
| 8,560,355 B2 | 10/2013 | Adamson et al. |
| 8,693,070 B2 | 4/2014 | Pandipati |
| 8,766,795 B1 | 7/2014 | Causey et al. |
| 2001/0042032 A1 | 11/2001 | Crawshaw et al. |
| 2001/0051911 A1 | 12/2001 | Marks et al. |
| 2001/0053999 A1 | 12/2001 | Feinberg |
| 2002/0007327 A1 | 1/2002 | Steury et al. |
| 2002/0026416 A1 | 2/2002 | Provinse |
| 2002/0042715 A1 | 4/2002 | Kelley |
| 2002/0065688 A1 | 5/2002 | Charlton et al. |
| 2002/0095256 A1 | 7/2002 | Jones et al. |
| 2002/0124067 A1 | 9/2002 | Parupudi et al. |
| 2002/0128971 A1 | 9/2002 | Narasimhan |
| 2002/0147619 A1 | 10/2002 | Floss et al. |
| 2002/0147678 A1 | 10/2002 | Drunsic |
| 2002/0152101 A1 | 10/2002 | Lawson et al. |
| 2002/0161610 A1 | 10/2002 | Walker et al. |
| 2002/0173978 A1 | 11/2002 | Boies et al. |
| 2003/0023463 A1 | 1/2003 | Dombroski et al. |
| 2003/0036918 A1 | 2/2003 | Pintsov |
| 2003/0046195 A1 | 3/2003 | Mao |
| 2003/0065805 A1 | 4/2003 | Barnes, Jr. |
| 2003/0088487 A1 | 5/2003 | Cheng et al. |
| 2003/0115141 A1 | 6/2003 | Felix et al. |
| 2003/0141411 A1 | 7/2003 | Pandya |
| 2003/0171990 A1 | 9/2003 | Rao et al. |
| 2003/0187705 A1 | 10/2003 | Schiff |
| 2004/0002876 A1 | 1/2004 | Sommers et al. |
| 2004/0044674 A1 | 3/2004 | Mohammadioun et al. |
| 2004/0083134 A1 | 4/2004 | Spero et al. |
| 2004/0193457 A1 | 9/2004 | Shogren |
| 2004/0198386 A1 | 10/2004 | Dupray |
| 2004/0210497 A1 | 10/2004 | Hirayama et al. |
| 2004/0210513 A1 | 10/2004 | Harford et al. |
| 2004/0215566 A1 | 10/2004 | Meurer |
| 2004/0243489 A1 | 12/2004 | Mitchell et al. |
| 2004/0267555 A1 | 12/2004 | Dale |
| 2005/0004830 A1 | 1/2005 | Rozell et al. |
| 2005/0015272 A1 | 1/2005 | Wind |
| 2005/0015295 A1 | 1/2005 | McCulloch |
| 2005/0027705 A1 | 2/2005 | Sadri et al. |
| 2005/0033616 A1 | 2/2005 | Vavul et al. |
| 2005/0033668 A1 | 2/2005 | Garcia et al. |
| 2005/0108068 A1 * | 5/2005 | Marcken et al. ............... 705/5 |
| 2005/0108069 A1 | 5/2005 | Shiran et al. |
| 2005/0108117 A1 | 5/2005 | Newman |
| 2005/0131770 A1 | 6/2005 | Agrawal |
| 2005/0165680 A1 | 7/2005 | Keeling et al. |
| 2005/0203760 A1 | 9/2005 | Gottumukkala et al. |
| 2005/0222854 A1 | 10/2005 | Dale et al. |
| 2005/0222944 A1 | 10/2005 | Dodson, Jr. et al. |
| 2005/0240601 A1 | 10/2005 | Lyons et al. |
| 2005/0251430 A1 | 11/2005 | Jindel |
| 2005/0267787 A1 | 12/2005 | Rose |
| 2005/0288973 A1 | 12/2005 | Taylor et al. |
| 2005/0288976 A1 | 12/2005 | Abrams et al. |
| 2006/0046740 A1 | 3/2006 | Johnson |
| 2006/0053053 A1 | 3/2006 | Baggett |
| 2006/0069504 A1 | 3/2006 | Bradley et al. |
| 2006/0069592 A1 | 3/2006 | Di Florio et al. |
| 2006/0106655 A1 | 5/2006 | Lettovsky et al. |
| 2006/0206363 A1 | 9/2006 | Gove |
| 2006/0212321 A1 | 9/2006 | Vance et al. |
| 2006/0241909 A1 | 10/2006 | Morgan et al. |
| 2006/0241983 A1 | 10/2006 | Viale et al. |
| 2006/0247993 A1 | 11/2006 | Scanlan et al. |
| 2006/0277079 A1 | 12/2006 | Gilligan et al. |
| 2006/0287880 A1 | 12/2006 | Fitzgerald et al. |
| 2006/0293931 A1 | 12/2006 | Fitzgerald et al. |
| 2007/0067193 A1 | 3/2007 | Robertson |
| 2007/0073562 A1 | 3/2007 | Brice et al. |
| 2007/0094056 A1 | 4/2007 | Kang et al. |
| 2007/0143155 A1 | 6/2007 | Whitsett et al. |

(56) References Cited

U.S. PATENT DOCUMENTS

| | | |
|---|---|---|
| 2007/0179863 A1 | 8/2007 | Stoll |
| 2008/0052217 A1 | 2/2008 | Etkin |
| 2008/0072067 A1 | 3/2008 | Koretz |
| 2008/0082373 A1 | 4/2008 | Durocher et al. |
| 2008/0086455 A1 | 4/2008 | Meisels et al. |
| 2008/0097873 A1 | 4/2008 | Cohen et al. |
| 2008/0126143 A1 | 5/2008 | Altman et al. |
| 2008/0154876 A1 | 6/2008 | Hao |
| 2008/0167887 A1 | 7/2008 | Marcken |
| 2008/0189148 A1 | 8/2008 | Diaz et al. |
| 2008/0198761 A1 | 8/2008 | Murawski et al. |
| 2008/0215406 A1 | 9/2008 | Pachon et al. |
| 2008/0262878 A1 | 10/2008 | Webby et al. |
| 2008/0270224 A1 | 10/2008 | Portman et al. |
| 2008/0319808 A1 | 12/2008 | Wofford et al. |
| 2009/0006143 A1 | 1/2009 | Orttung et al. |
| 2009/0012824 A1 | 1/2009 | Brockway et al. |
| 2009/0099965 A1 | 4/2009 | Grant |
| 2009/0125321 A1 | 5/2009 | Charlebois et al. |
| 2009/0157513 A1 | 6/2009 | Bonev et al. |
| 2009/0187449 A1 | 7/2009 | Van Tulder et al. |
| 2009/0210262 A1 | 8/2009 | Rines |
| 2009/0216746 A1* | 8/2009 | Aubin et al. ............ 707/5 |
| 2009/0271302 A1 | 10/2009 | Hamper |
| 2010/0045705 A1 | 2/2010 | Vertegaal |
| 2010/0057502 A1 | 3/2010 | Arguelles et al. |
| 2010/0121660 A1 | 5/2010 | Boykin |
| 2010/0175001 A1 | 7/2010 | Lazarus et al. |
| 2010/0228628 A1 | 9/2010 | Dufour |
| 2010/0257195 A1 | 10/2010 | Inoue et al. |
| 2010/0305984 A1 | 12/2010 | Ben-Yitschak |
| 2011/0029413 A1 | 2/2011 | Ben-Tzur et al. |
| 2011/0045801 A1 | 2/2011 | Parker, II |
| 2011/0060480 A1 | 3/2011 | Mottla et al. |
| 2011/0246246 A1 | 10/2011 | Johnson |
| 2011/0258005 A1 | 10/2011 | Fredericks et al. |
| 2011/0270715 A1 | 11/2011 | Moorhead |
| 2011/0282964 A1 | 11/2011 | Krishnaswamy |
| 2011/0288768 A1 | 11/2011 | Stefani et al. |
| 2011/0307280 A1* | 12/2011 | Mandelbaum ............ 705/6 |
| 2012/0046049 A1 | 2/2012 | Curtis |
| 2012/0157795 A1 | 6/2012 | Chiu et al. |
| 2012/0209640 A1 | 8/2012 | Hamper |
| 2012/0281584 A1 | 11/2012 | Powers |
| 2012/0321281 A1 | 12/2012 | Hilem |
| 2012/0330906 A1 | 12/2012 | Fredericks et al. |
| 2013/0041696 A1* | 2/2013 | Richard ................. 705/5 |
| 2013/0166607 A1 | 6/2013 | Turk et al. |
| 2013/0268878 A1 | 10/2013 | Le Roux et al. |

OTHER PUBLICATIONS

PR Newswire, Concur Technologies Launches Concur Expense 7.0, Jul. 24, 2003, p. 1.
"Gelco Information", Business Wire, Mar. 17, 1998.
"American Express Announces New Features in the latest Release of AXI(SM) at Corporate Travel World", PR Newswire, Mar. 2, 1998, p0302NYM159.
"Thread: Pay Per Impression Programs", Digital Point Forums, Mar. 2005, found online at forums.digitalpoint.com/showthread.php?t=12248.
File history of U.S. Appl. No. 10/373,096.
File history of U.S. Appl. No. 10/270,672.
File history of U.S. Appl. No. 11/159,398.
File history of U.S. Appl. No. 12/755,127.
File history of U.S. Appl. No. 11/774,489.
File history of U.S. Appl. No. 13/277,923.
File history of U.S. Appl. No. 13/602,589.
Nancy Trejos, "Travelers have no patience for slow mobile websites", dated May 6, 2012, http://www.usatoday.com/USCP/PNI/Features/2012-05-06-PNI0506tra-website-speedART_ST_U.htm.
Gary Stoller, "For Travel Companies, the slower the website, the smaller the potential profit", dated Jun. 1, 2011, http://www.usatoday.com/MONEY/usaedition/2011-06-2-travelweb-27ART_CV_U.htm.
Oct. 22, 2009 "Suppliers Work on Ancillary Air Fee Reporting" McNulty Business Travel News.
File history of U.S. Appl. No. 12/371,548.
www.concur.com, from Web Archive, http://web.archive.org/web/20000622043004/http://www.concur.com/, archived Jun. 22, 2000, printed Jan. 6, 2014 (61 pages).
www.outtask.com, from Web Archive, http://web.archive.org/web/20001009025559/http://www.outtask.com/, archived Oct. 9, 2000, printed Jan. 6, 2014 (8 pages).
File history of U.S. Appl. No. 14/213,523.
File history of U.S. Appl. No. 14/219,745.
Joseph Kornick, "Firm's new system tracks, refunds unused e-tickets" Travel Weekly, May 20, 1999.
File History of U.S. Appl. No. 13/060,960.
File History of U.S. Appl. No. 14/188,414,
File History of U.S. Appl. No. 13/396,255.
File History of U.S. Appl. No. 09/784,836.
File History of U.S. Appl. No. 10/225,736.
File History of U.S. Appl. No. 11/983,949.
Juile Barker, "Keeping Control When Hotel Costs Soar", Successful Meetings, vol. 47, No. 3, pp. 31, Mar. 1998.
David Eisen, "Setting Up a Hotel Program", Business Travel News, vol. 23, No. 7, pp. 58(8) Apr. 24, 2006.
Edward P. Gilligan, "Trimming Your T&E is Easier Than You Think", Managing Office Technology, vol. 40, No. 11, pp. 39-40, Nov. 1995.
Mal Gormley, "NBAA's Travel$ense", Business and Commercial Aviation, vol. 79, No. 2, pp. 60, Aug. 29, 1996.
Eric K. Clemons et al., "Ahead of the Pack Through Vision and Hustle: A Case Study of Information Technology at Rosenbluth Travel", IEEE, pp. 287-296 (1991).
Bruce Schumacher, "Proactive Flights Schedule Evaluation at Delta Air Lines", Proceedings of the 1999 Winter Simulation Conference, pp. 1232-1237 (1999).
Paul Katz et al., "Making the Most of a Telephone Company's Purchasing Power", Belcore Exchange, pp. 23-27, Mar./Apr. 1990.
Amir a. Sadrian et al., "A Procurement Decision Support System in Business Volume Discount Environments", Operations Research, vol. 42, No. 1, pp. 14-23, Jan.-Feb. 1994.
Amir A. Sadrian et al., "Business Volume Discount: A New Perspective on Discount Pricing Strategy", The National Association of Purchasing Management, Inc., pp. 43-46, Apr. 1992.
James V. Jucker et al., "Single-Period Inventory Models with Demand Uncertainty and Quantity Discounts: Behavioral Implications and a New Solution Procedure", Naval Research Logistics Quarterly, vol. 32, pp. 537-550 (1985).
Robert J. Dolan, "Quantity Discounts: Managerial Issues and Research Opportunities", Marketing Science, vol. 6, No. 1, pp. 1-24, Winter 1987.
Z. Drezner et al., "Theory and Methodology: Multi-buyer discount pricing", European Journal of Operational Research, vol. 40, pp. 38-42 (1989).
Hasan Pirkul et al., "Capacitated Multiple Item Ordering Problem with Quantity Discounts", IIE Transactions, vol. 17, No. 3, pp. 206-211, Sep. 1985.
Paul Katz et al., "Telephone Companies Analyze Price Quotations with Bellcore's PDSS Software", Interfaces 24, pp. 50-63, Jan. 1-Feb. 1994.
Ram Narasimhan et al., "Optimizing Aggregate Procurement Allocation Decisions", Journal of Purchasing and Materials Management, pp. 23-30, May 1986.
James C. Bean et al., "Reducing Travelling Costs and Player Fatigue in the National Basketball Association", Interfaces, vol. 10, No. 3, pp. 98-102, Jun. 1980.
Robert A. Russell et al., "Devising a Cost Effective Schedule for a Baseball League", Operations Research, vol. 42, No. 4, pp. 614-625, Jul.-Aug. 1994.
Jacques A. Ferland et al., "Computer Aided Scheduling for a Sport League", Infor., vol. 29, No. 1, pp. 14-25, Feb. 1991.
Jeffrey L. Huisingh et al., "OffSite: Federal Employee Training Site Selection Software", US Army Tradoc Analysis Center-Monterey Technical Report No. 98-02, Nov. 1998 (163 pages).

(56) References Cited

OTHER PUBLICATIONS

Jeffrey Huisingh et al., "New Travel Software Save Time, Money", http://www.dla.mil/Dimensions/Septoct99/Sep98//Sep_page_19.htm, Sep./Oct. 1998 (5 pages).
David A. Shepherd, "A Slam Model of Domestic Airline Passenger Fares and the Contract Air Service Program", Air Force Inst. of Tech., Wright-Patterson AFG, OH. School of Systems and Logistics, Sep. 1986 (136 pages).
R.A. Russell, "Scheduling the Texas League with Multiple Objectives", 1994 Proceedings Decisions Sciences Institute, pp. 1248-1250, 1994.
D. Bartholomew, "Cleared for Takeoff", InformationWeek, pp. 55, Mar. 1993.
Matthew E. Berge et al., "Demand Drive Dispatch: A method for Dynamic Aircraft Capacity Assignment, Models and Algorithms", Operations Research, vol. 41, No. 1, pp. 153-168, Jan.-Feb. 1993.
File History of U.S. Appl. No. 12/773,282.
File History of U.S. Appl. No. 11/763,562.
File History of U.S. Appl. No. 12/901,947.
File History of U.S. Appl. No. 13/117,303.
File History of U.S. Appl. No. 13/277,916.
File History of U.S. Appl. No. 13/606,494.
File History of U.S. Appl. No. 13/712,629.
File History of U.S. Appl. No. 13/830,319.
File History of U.S. Appl. No. 14/060,960.
File History of U.S. Appl. No. 14/188,414.
File History of U.S. Appl. No. 12/465,067.
File History of U.S. Appl. No. 14/994,822.
File History of U.S. Appl. No. 13/712,614.
File History of U.S. Appl. No. 13/842,913.
File History of U.S. Appl. No. 13/830,410.
File History of U.S. Appl. No. 14/036,320.
File History of U.S. Appl. No. 14/213,550.
File History of U.S. Appl. No. 14/997,019.

* cited by examiner

Original Reservations

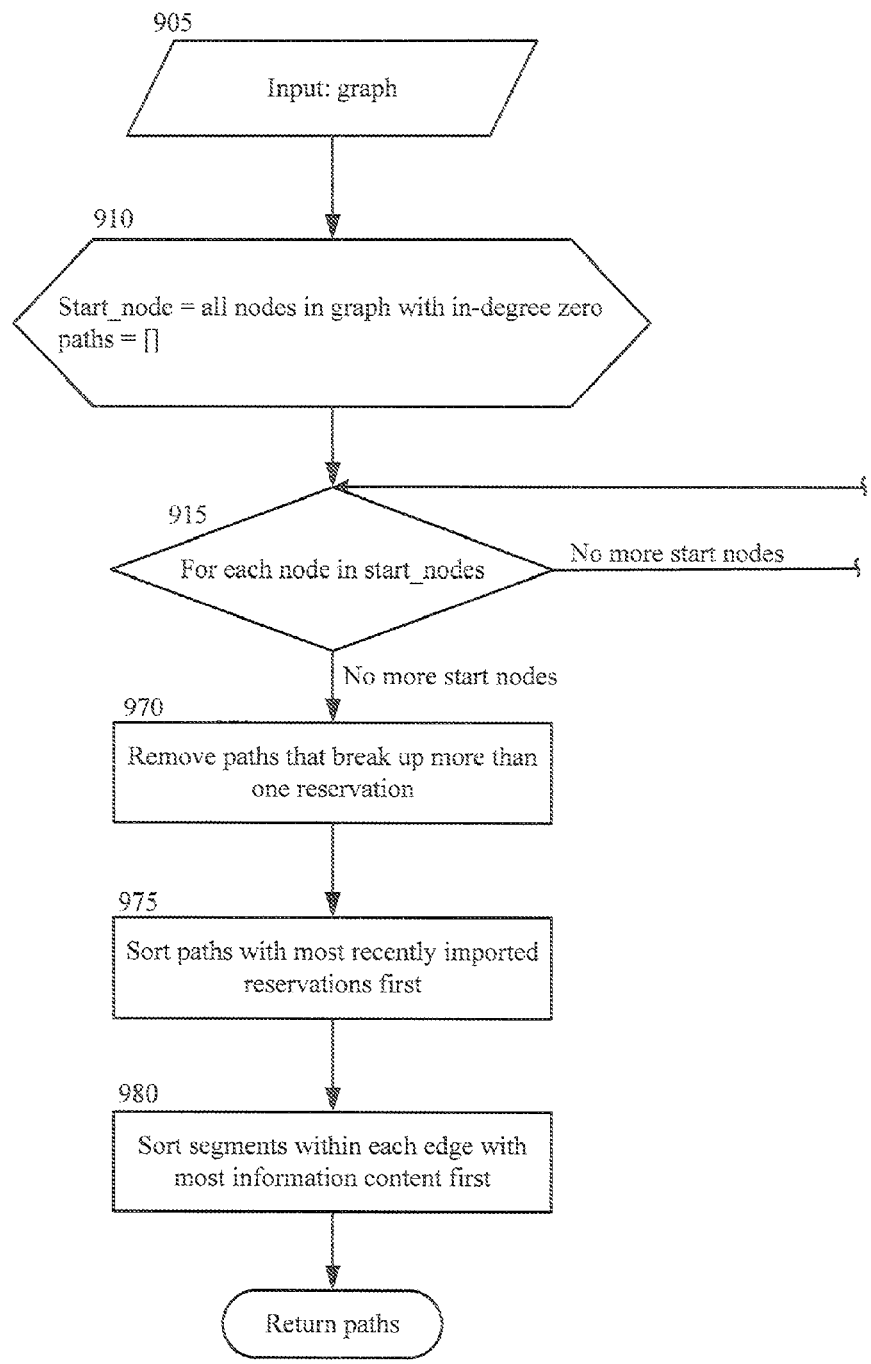

METHOD AND SYSTEM FOR DETECTING DUPLICATE TRAVEL PATH INFORMATION

CROSS-REFERENCE TO RELATED APPLICATIONS

This application claims the benefit of U.S. Provisional Application No. 61/529,680, filed Aug. 31, 2011, which is incorporated by reference in its entirety.

DETAILED DESCRIPTION OF EMBODIMENTS OF THE INVENTION

Figure 1:
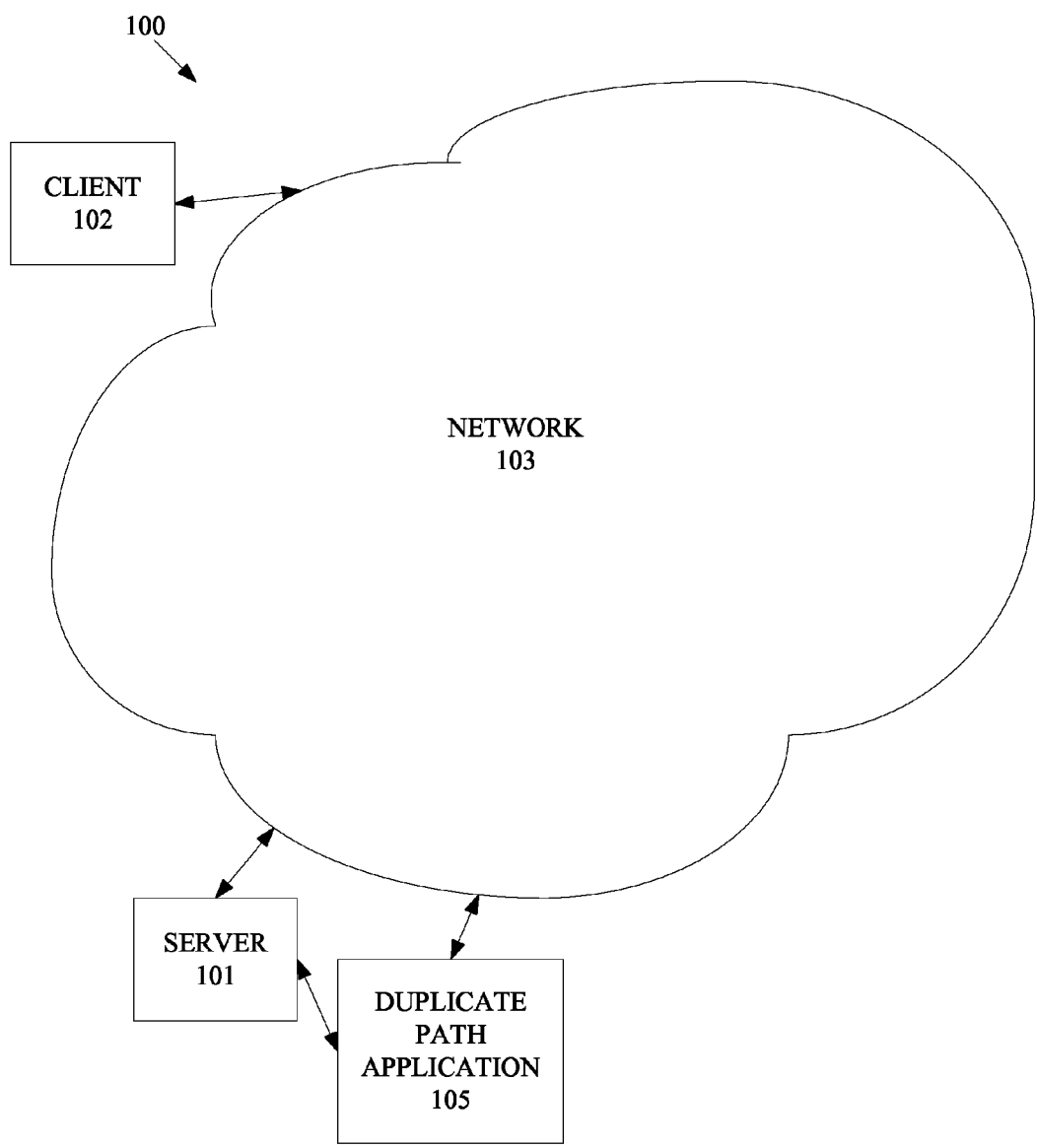
FIGS. 1 and 7 illustrate a system for detecting duplicate travel path information, according to an embodiment of the invention.

FIG. 1 illustrates a system 100 for detecting duplicate travel path information, according to an embodiment. System 100 may include, but is not limited to: a client 102 communicating with a server 101 over a network 103 utilizing a duplicate path application 105. The duplicate path application 105 may run utilizing server 101. The network 103 may comprise an Internet and/or an intranet. The client 102 and server 101 may comprise a computer. The computer may be any programmable machine capable of performing arithmetic and/or logical operations. In some embodiments, computers may comprise processors, memories, data storage devices, and/or other commonly known or novel components. These components may be connected physically or through network or wireless links. Computers may be referred to with terms that are commonly used by those of ordinary skill in the relevant arts, such as servers, PCs, mobile devices, and other terms. It will be understood by those of ordinary skill that those terms used herein are interchangeable, and any computer capable of performing the described functions may be used. For example, though the term "server" may appear in the following specification, the disclosed embodiments are not limited to servers.

Figure 7:
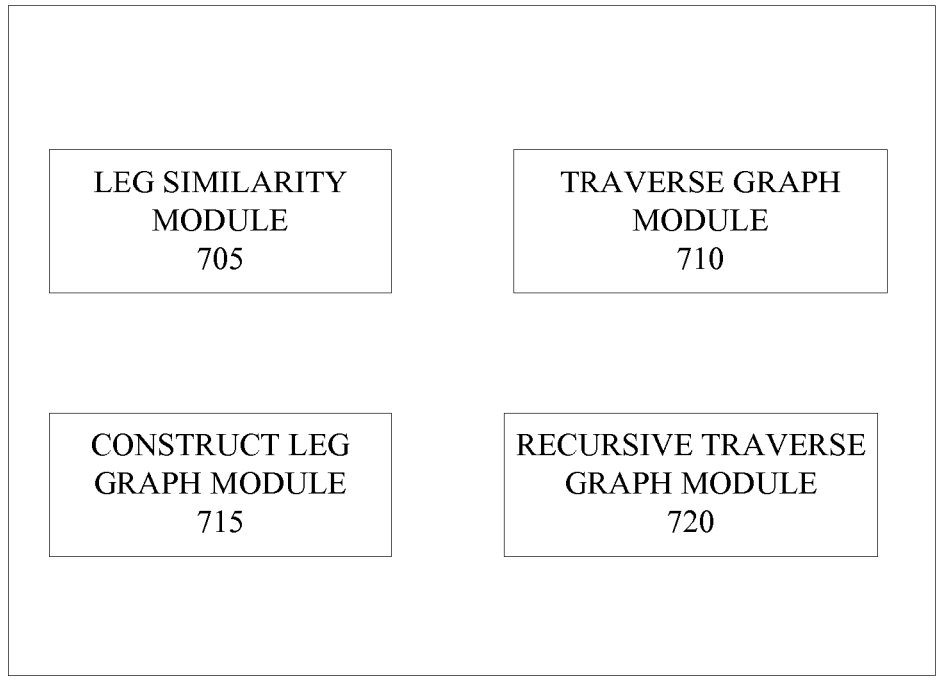

FIG. 7 sets forth details of the duplicate path application 105, according to an embodiment. For travel booking and planning, it may be useful to import (e.g., manually, automatically) travel reservation information (e.g., from emails, other booking systems, etc.) about a trip. A trip may be a collection of related reservations. A reservation may be a single version of a travel plan as imported from another system, entered manually, etc. A reservation may contain a sequence of segments. A segment may be a single unit of travel (e.g., individual flight) with an origin and destination. A leg may be a sequence of segments in a reservation that are separated by a certain amount of time (e.g., fewer than 4 hours, such as when the arrival time of one segments is less than four hours before the departure time of the subsequent segment).

When importing information, duplicate information may be imported. Exact duplicates may be removed by direct comparison to existing data. Inexact duplicates may also be resolved. The duplicate path application 105 may find inexact duplicates, and may include, but is not limited to: a leg similarity module 705, a construct leg graph module 715, a traverse graph module 710, or a recursive traverse graph module 720, or any combination thereof. The leg similarity module 705 may determine whether legs are similar. The construct leg graph module 715 may construct a segment graph. The traverse graph module 710 may traverse and recursively traverse the segment graph.

Figure 2:
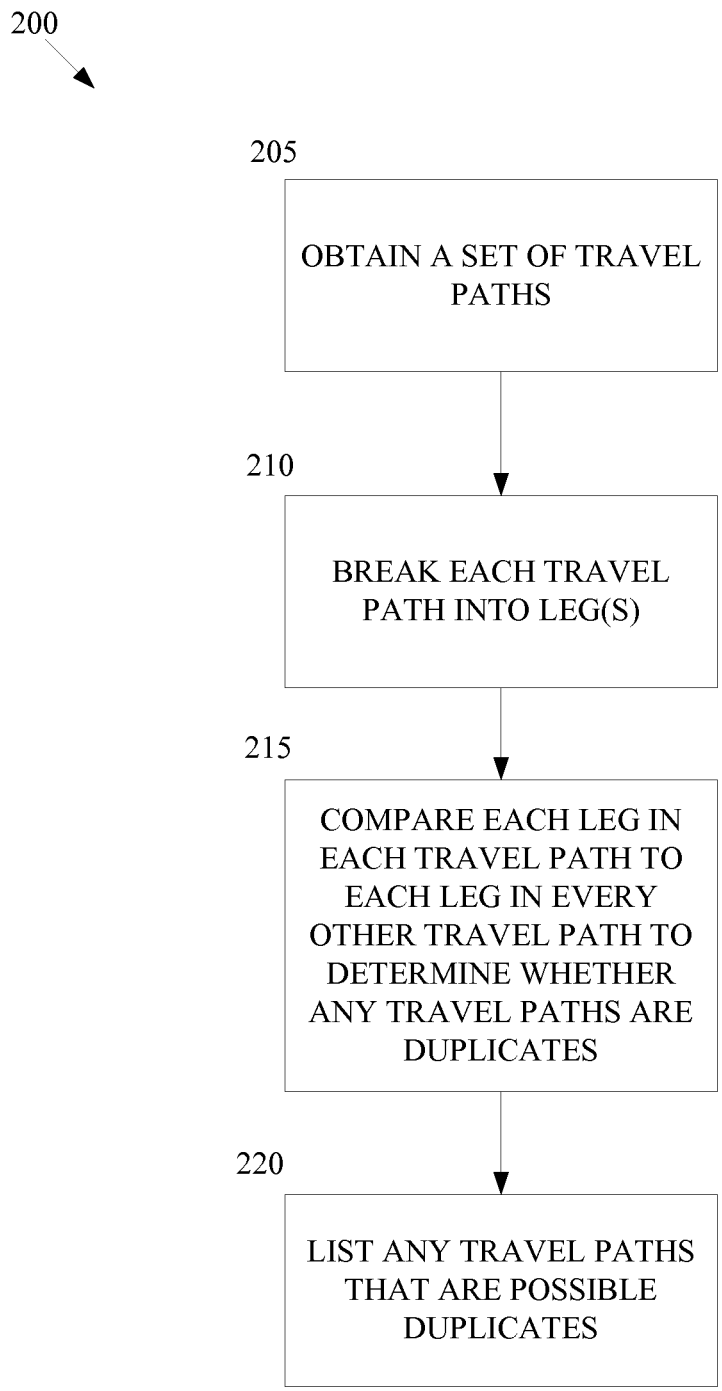
FIGS. 2-3C and 8-10B illustrate a method for detecting duplicate travel path information, according to an embodiment of the invention.

FIG. 2 illustrates a method 200 for detecting duplicate travel path information, according to an embodiment. In 205, a set of travel paths may be obtained. In 210, each travel path may be broken into one or more legs. Thus, each travel path may be broken in to one or more sequences of segments (e.g., with less than four hours between them). In 215, each leg in each travel path may be compared to each leg in every other travel path to determine whether any travel paths are duplicates. This may be done by creating a set containing each leg. Then, each leg in a reservation may be compared to each leg in every other reservation. If the sequences in the legs are similar, the sets containing the legs may be merged. Further details on 215 are described below with respect to FIGS. 3A-3C. In 220, any travel paths that are possible duplicates may be listed. This may be done by constructing a segment graph (explained in more detail in FIG. 8) and then traversing the segment graph (explained in more detail in FIGS. 9A-9B) for each resulting set of similar legs. This may yield a sorted list of candidate paths of segments that may resolve the group of conflicting reservations. Manual intervention may be used to select the correct path from among the candidate paths. In an embodiment, the first path in the sorted list of candidates may be the path most likely to be the correct path.

Figure 3A:
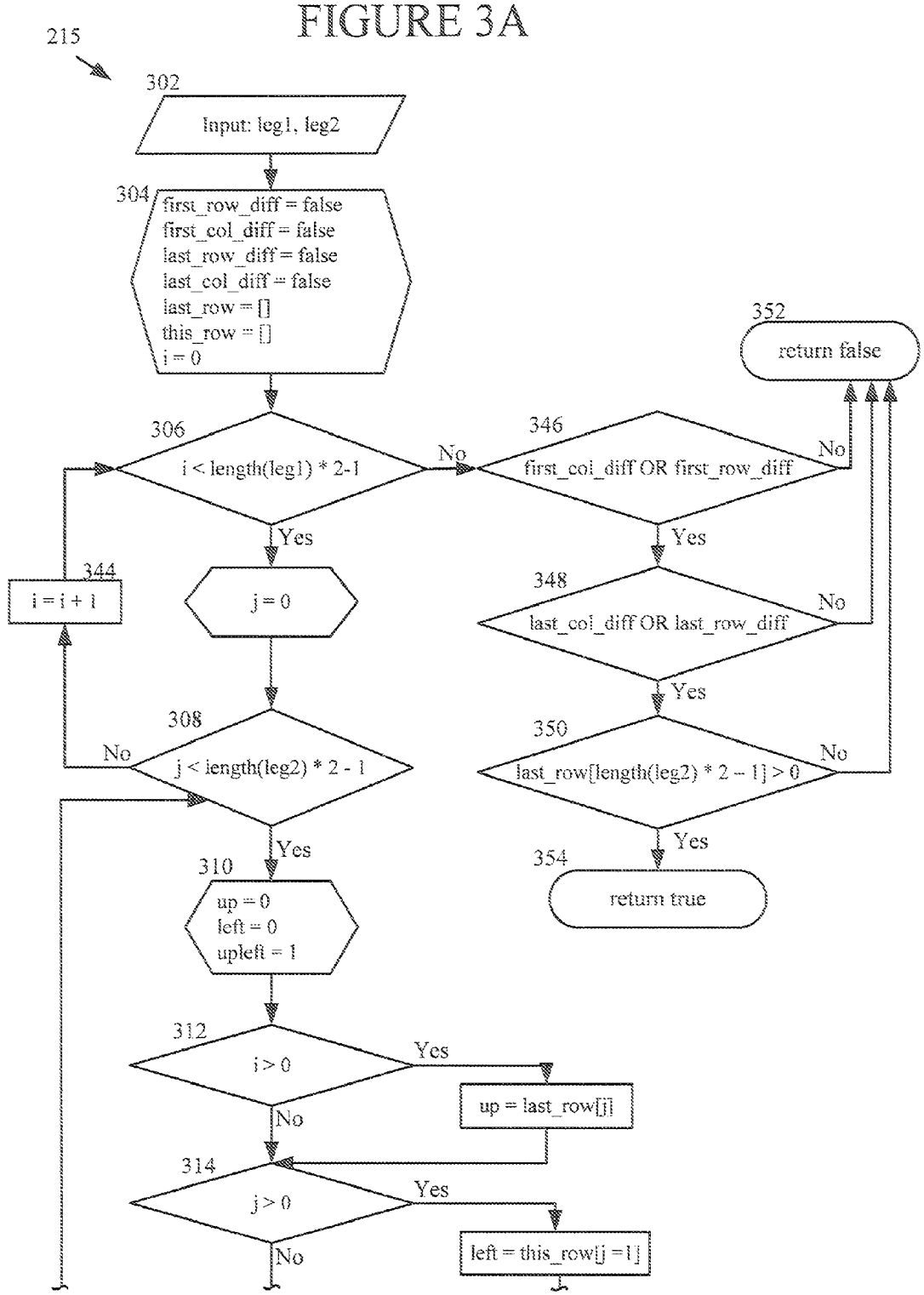
Figure 3B:
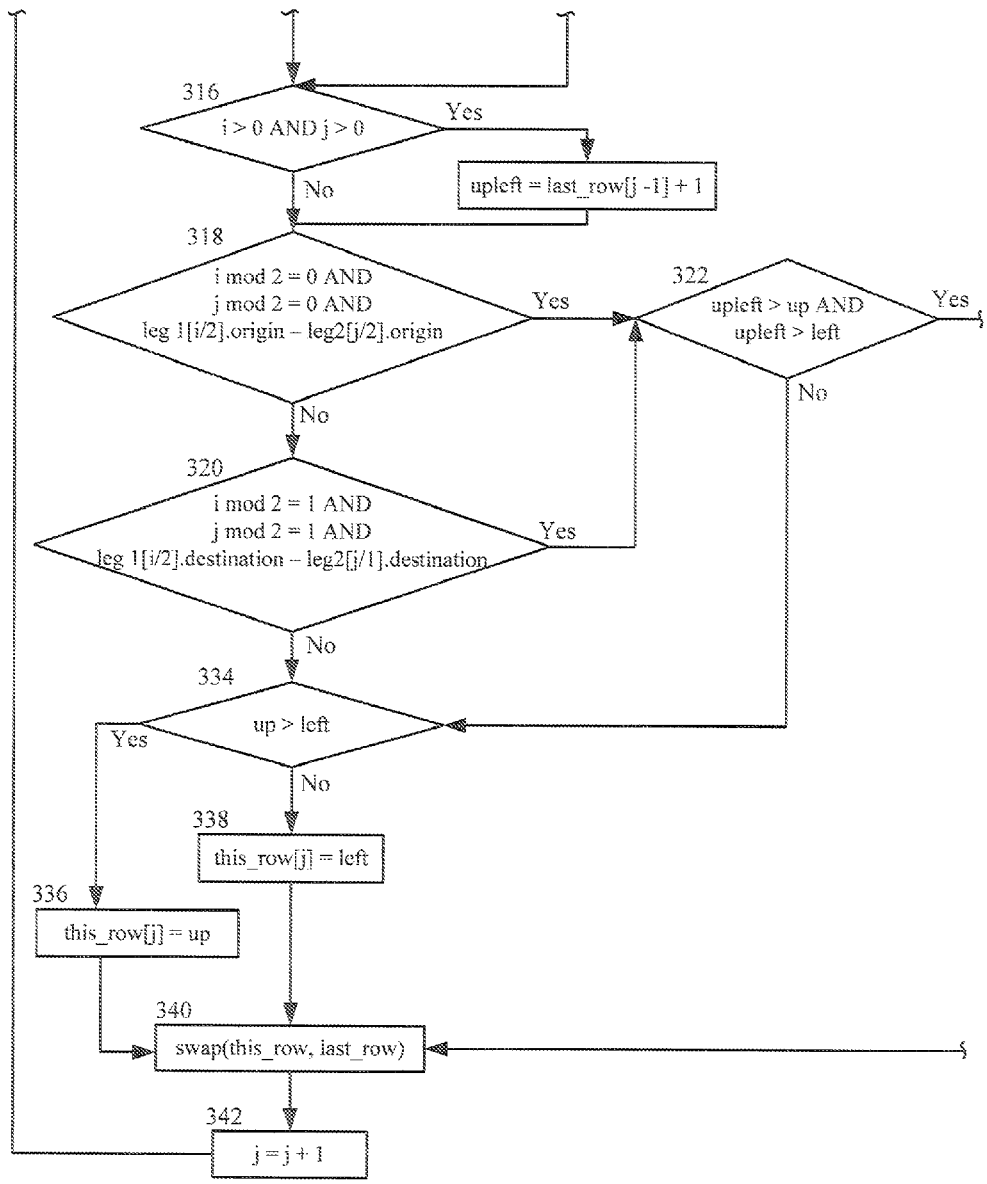
Figure 3C:
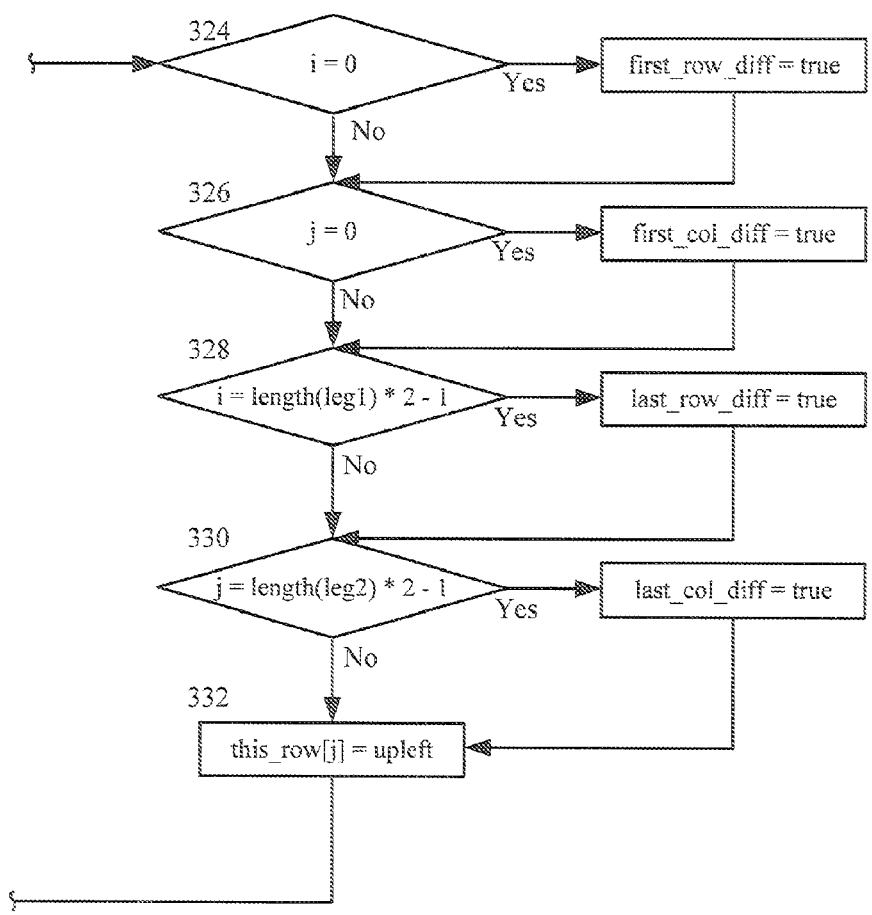

FIGS. 3A-3C illustrates a method for comparing legs to one another, according to an embodiment. Depending on the form of a reservation record, the reservation record may include a complete travel reservation, an updated travel reservation, or a partial travel reservation, or any combination thereof. In order to group related legs together, the similarity of two legs may be defined as containing a common subsequence, where the common subsequence contains at least one of their start points and one of their end points. The details of FIGS. 3A-3C will be set forth below. The examples in FIG. 4 and FIG. 5 will be referred to in explaining the details of FIGS. 3A-3C. The boxes in the charts in FIG. 4 and FIG. 5 have been marked with reference numerals to aid in the discussion of the examples.

Figure 4:
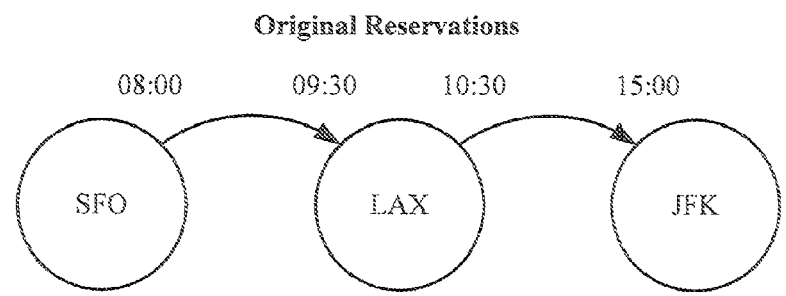
FIGS. 4-6 illustrate example embodiments of the invention.
Figure 4:
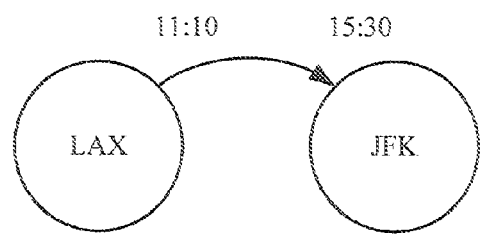
Figure 5:
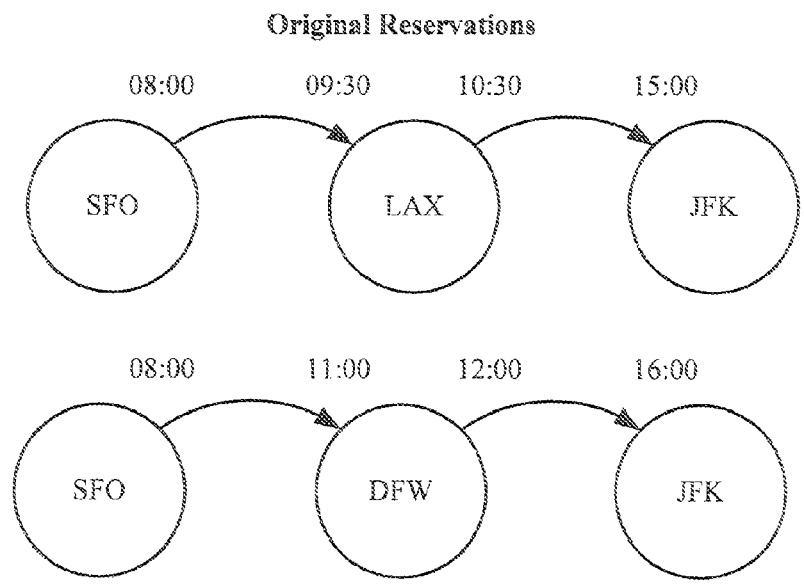

Referring to FIGS. 3A-3C, in 302, legs may be input so that they may be compared. For example, in FIG. 4, the leg including the segments SFO to LAX and LAX to JFK may be input, and in FIG. 5, the leg including the segment LAX to JFK may also be input. In 304, flags may be set to track whether the first and last columns and rows differ from their neighbors. These flags indicate whether the first or last segments of each leg are in the common subsequence. An array may also be created to store the current and previous rows of the dynamic programming table. In 306, each row of the table may be looped, using i as an index. In 308, each column of the table may be looped, using j as an index. In 310, in case the first row or first column is being looped, the length of the longest subsequence so far may be initialized to be 0, or, in the case of a segment match, 1. Thus, for example, box 7 in FIG. 4 takes the value of 0, since SFO does not match LAX. With respect to FIG. 5, box 7 takes the value 1, since SFO does match SFO. In 312, if looping on the second or later row, the previous row may be referred to for a possible longest subsequence so far. Thus, if i is greater than 0 (e.g., are we looping on at least the second row?), the length of the subsequence may be set to up. For example, with respect to FIG. 4, box 14 takes the value of 1, which is copied from box 9, since LAX does not match JFK. With respect to FIG. 5, box 12 takes the value of 1, which is copied from box 7, since SFO does not match DFW. If i is not greater than 0, than in 314, it is determined if j is greater than 0 (e.g., are we looping on at least the second column?). If j is greater than 0, the length of the subsequence may be set to left. If j is not greater than 0, then in 316, we can look to the upper left in the previous row and previous column. The length of the common subsequence so far may be set as upleft (e.g., the box diagonal to the box being considered plus one). This subsequence will only be used if the current position in the table occupies the intersection of matching segments in leg1 and leg2. For example, in FIG. 4, box 9 takes the value 1, which is the value of box 3 plus 1. This is because a segment origin of LAX in one leg matches a segment origin of LAX in the other leg. Note that FIG. 4, box 8 takes the value 0, since a destination of LAX in one leg does not match an origin of LAX in the other leg. With respect to FIG. 5, box 25 takes the value 2, which is the value of box 19 plus one. This is because the destination JFK in one leg matches the destination JFK in the other leg. In 318, if both leg1 at position i and leg2 at position j are origins (e.g., i and j are both even), and the identities of the two origins are the same, upleft may be considered as the best subsequence so far. In 320, if both leg1 at position i and leg2 at position j are destinations (e.g., i and j are both odd), and the identities of the two destinations are the same, upleft may be considered as the best subsequence so far. In 322, if upleft is greater than both up and left, then it is the length of the longest subsequence of which the current match is a part. In FIG. 4, box 9, for example, up is 0, left is 0, and upleft is computed to be 1 (because the value of box 3 is 0, and 0+1=1), since LAX matches LAX. In FIG. 5, box 25, the situation is similar; up is 1, left is 1, and upleft is computed to be 2, since JFK matches JFK and 1 is added to the value of box 19 (1) to yield 2. In 324, if we are in the first row, it may be remembered that we detected a difference in the first row. In 326, if we are in the first column, it may be remembered that a difference was detected in the first column. In 328, if we are in the last row, it may be remembered that we detected a difference in that row. In 330, if we are in the last column, it may be remembered that we detected a difference in that column. With respect to FIG. 4, there are differences shown in the first rows (e.g., boxes 4 and 5 differ from boxes 9 and 10) and the last columns (e.g., boxes 9 and 14 differ from boxes 10 and 15). In FIG. 5, there are differences shown in the first rows (e.g., boxes 2, 3, 4 and 5 differ from boxes 7, 8, 9 and 10), first columns (e.g., boxes 6, 11, 18 and 21 differ from boxes 7, 12, 17, 22), last rows (e.g., boxes 17, 18, 19, and 20 differ from boxes 22, 23, 24 and 25), and last columns (e.g., boxes 9, 14, 19, and 24 differ from boxes 10, 15, 20 and 25). In each case, this may be sufficient to indicate that the first segments or last segments of either leg are included in the common subsequence, which may be a necessary condition for considering the legs to be similar. In 332, the current table location may be filled with the value of upleft, the length of the longest common subsequence so far. In 334, it may be checked whether up or left (e.g., the box above or the box to the left) is greater. If up is greater, in 336, the current table location may be filled with the value of up, the length of the longest common subsequence so far. For example, FIG. 4, box 14 and FIG. 5, box 12 are filled with the value of the boxes above them, since that value is greater than the values in the boxes to the left of them. If left is greater, in 338, the current table location may be filled with the value of left, the length of the longest common subsequence so far. For example, FIG. 4, box 10 and FIG. 5, box 8 are filled with the value of the boxes to the left of them, since that value is greater than the values in the boxes above them. If up and left are equal, we may, without loss of generality choose the value of either up or left to fill the current table location. In 340, this_row and last_row may be swapped to move the current row into the previous row's position and to make room to store the next row. In 342, we may loop to the next row. In 344, we may loop to the next column. In 346, if the first column and the first row are both the same as their previous neighbors (e.g., all 0), then this may indicate that neither leg's first segment is represented in the common subsequence, so the match may be rejected in 352. In FIG. 4, this would have been the case if boxes 7, 8, 9, 10, and 12 were all zero and therefore equal to the previous adjacent rows and columns. In FIG. 5, this would have been the case if boxes 7, 8, 9, 10, 12, 17, and 22 were all zero and therefore equal to the previous adjacent rows and columns. In neither case was this true, so neither match may be rejected on this basis. In 348, if the last column and the last row are both the same as their previous neighbors, then this may indicate that neither leg's last segment is represented in the common subsequence, so the match may be rejected in 352. In FIG. 4, this would have been the case if boxes 10, 12, 13, 14, and 15 were equal to the previous adjacent rows and columns. In FIG. 5, this would have been the case if boxes 10, 15, 20, 22, 23, 24, and 25 were equal to the previous adjacent rows and columns. In neither case was this true, so neither match may be rejected on this basis. In 350, if the bottom-right-most element in the table is greater than 0, then there may be a nonempty common subsequence, so the match may be accepted in 354. In FIG. 4, box 15 takes the value 2 and in FIG. 5, box 25 takes the value 2, so in both cases, there may be a nonempty common subsequence. If the answer to 346, 348, or 350 is no, in 352, the match may be rejected. If the answer to 346, 348 and 350 is yes, in 354, the match may be accepted.

After groups of legs that are similar to each other are identified, as shown in FIGS. 3A-3C, which sequences of segments may represent an accurate representation of the correct travel reservation may be determined. To do this, a segment graph may be created where nodes represent origins and destinations, and edges represent bundles of identical segments. Each edge may represent one or more segments if the segments are identical. If two segments are not identical, but the segments have the same origin and destination, then they may be represented by two separate edges with the same origin and destination, which may result in a multigraph.

Figure 8:
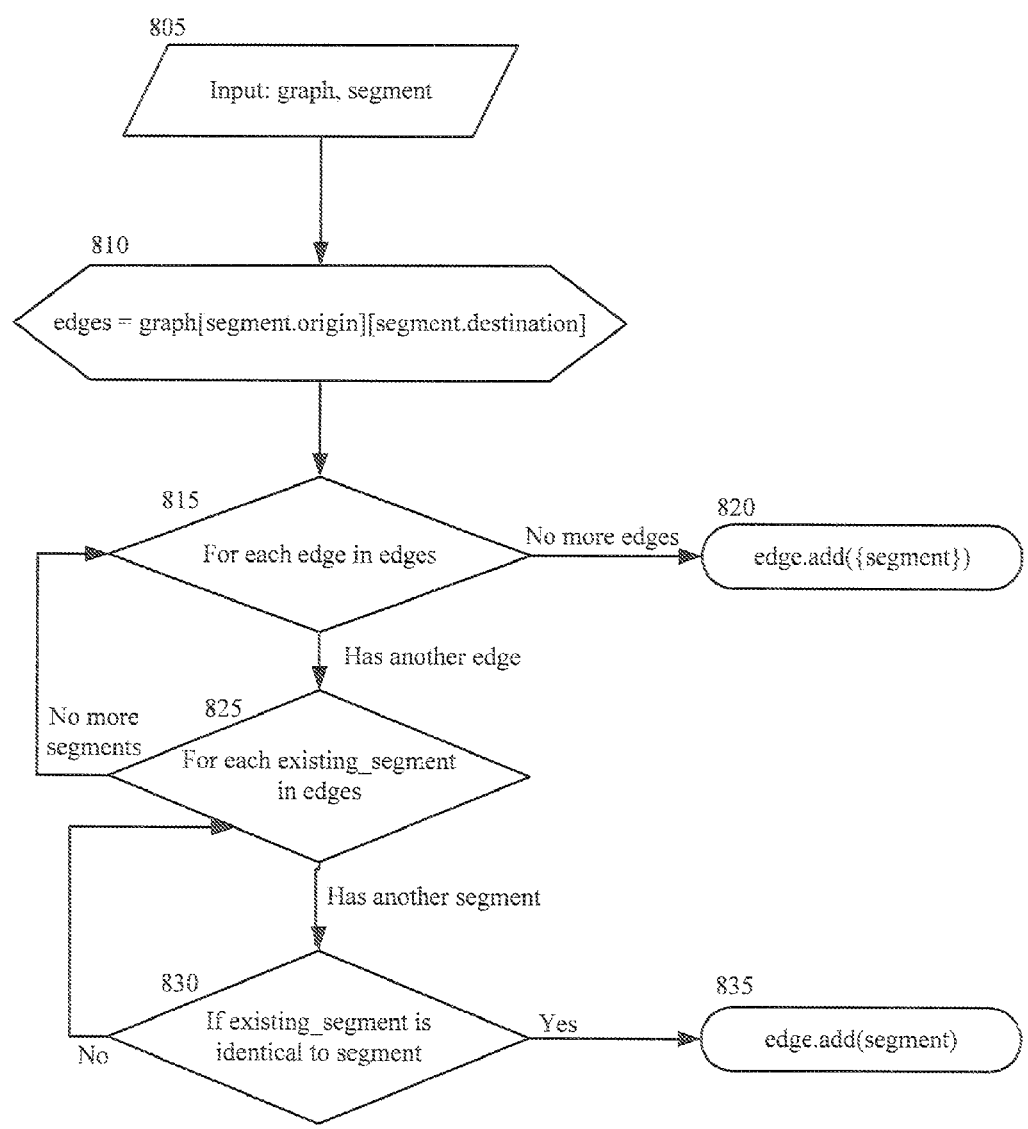

As explained above, FIG. 8 illustrates details relating to constructing the segment graph, according to an embodiment. The graph data structure may comprise a collection of edges stored in a two dimensional associative array. The first dimension may be the identity of the origin of the segments in an edge. The second dimension may be the identity of the destination of the segments in an edge. The contents of the two dimensional associative array may be an array containing one or more edges. Each edge may be a set of identical segments. Referring to FIG. 8, in 805, the graph we are building so far and the segment we wish to add to it may be input. The graph may be represented by a two dimensional associative array, indexed by origin and destination of segments. Each element of the graph may be a list of edges. Each edge may be a set of mutually identical segments. In 810, the set of edges from the segment's origin and to the segment's destination may be obtained. In 815, the existing edges may be looped over. In 820, when there are no more edges, a new edge may be created with only the new segment, and this may be added to the graph. In 825, the segments in the existing edge may be looped over. In 830, it may be determined whether the new segment is identical to the existing segment in the existing edge. In 835, if the new segment is identical, it may be added to the existing edge. This may maintain the invariant that identical edges occupy the same edge and non-identical segments belong to separate edges in the graph.

The process explained in FIG. 8 may be performed for each segment from each similar leg to construct a graph containing all of the segments. After the segment graph has been constructed, the segment graph may be traversed to find paths of segments that may result in a correct reservation. We may begin from each node with an in-degree of zero and recursively follow edges until we reach a node with an out-degree of zero. We may also impose the restriction that no resulting path may break up more than one reservation. This may prevent forming implausible combinations of travel plans and may reduce the number of plans that must be manually examined for correctness. In addition, we may sort the resulting paths to place the most recently imported plans at the top of the list. Within each edge in a path, we may sort the segments to place the one with the most information first. This may provide a ranking of likelihood of any one candidate travel plan being the current correct plan.

Figure 9B:
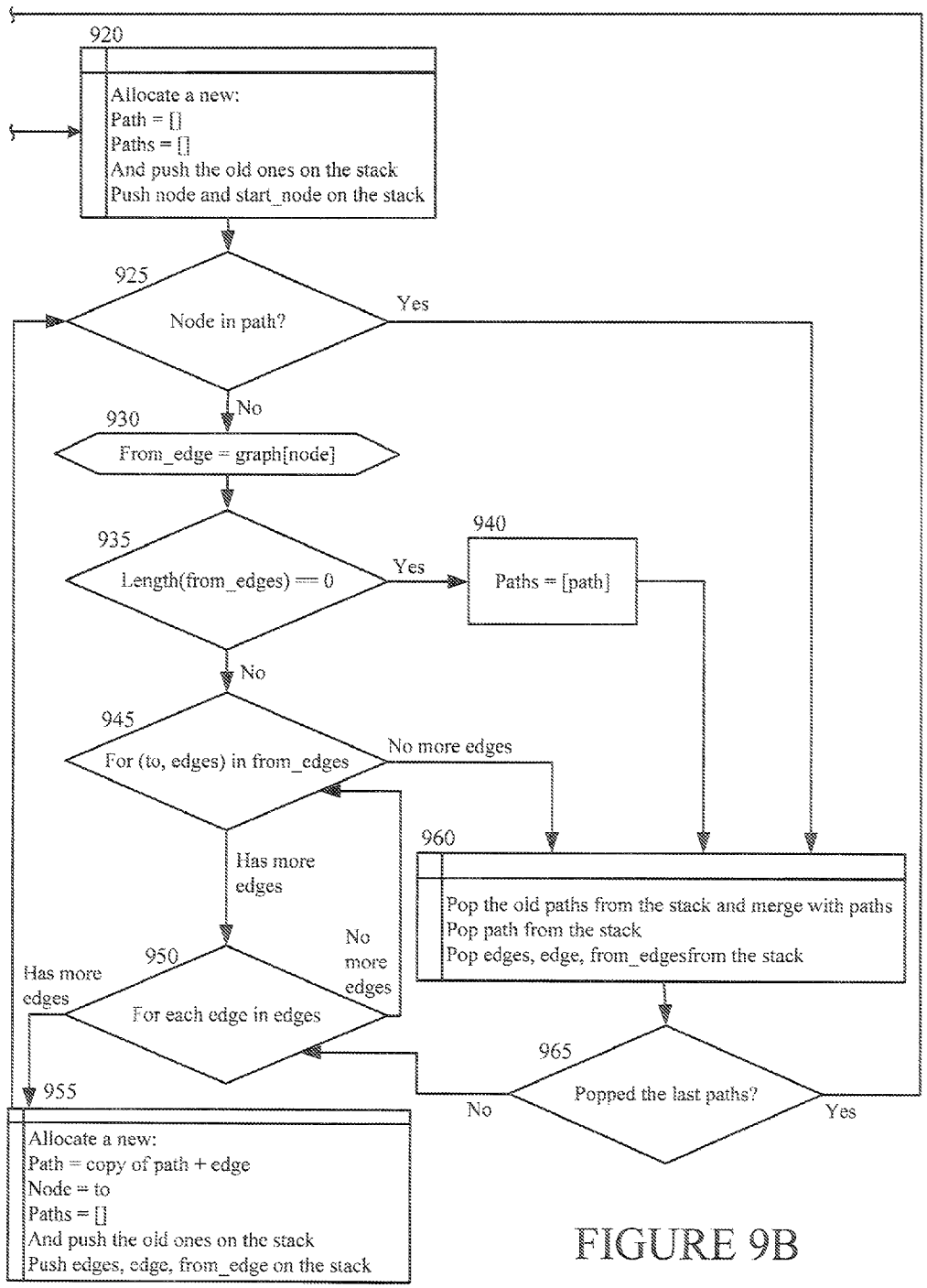

Referring to FIGS. 9A-9B, in 905, the segment graph to traverse may be input. In 910, the start nodes may be found (which may represent the starting travel locations) by looking for nodes in the graph with no edges pointing to them. A resulting array of paths to be empty may also be initialized. In 915, the start nodes may be looped over. In 920, the paths through the graph starting with a start node may be recursively traversed. A stack may be used to keep track of the current location as we traverse the graph. In 925, we may check for cycles in the path. In 930, the set of edges that originate at the current node may be obtained so that we can follow them. In 935, if there are no edges that originate at the current node, then we have found a final destination node. In 940, we may return to the path that we took to get to the current final destination mode. In 945, we may loop over the nodes to which we can travel from the current node. In 950, we may loop over the edges from the current node to the next node. In 955, we may recursively traverse the rest of the graph, starting at the next mode. We may need to store our current state on a stack so that we can resume traversing the rest of the graph after traversing the next node. In 960, once there are no more edges from the current node to traverse, we may pop the previous set of paths from the stack and merge the current set with it. We may then resume recursively traversing the graph starting with the previous node. In 965, if we have popped the last set of paths from the stack, then we have returned to the start node. We may go back and traverse the graph from the next start mode. In 970, once there are no more start nodes, we may have a complete collection of paths through the graph. We may remove all paths from the list that break up more than one reservation. In 975, we may sort the paths so that the most recently imported paths are at the start of the list of paths. This may place the paths that are more likely to be correct at the start of the list. In 980, within each edge, we may sort the segments so that the segments with the most information are at the start of the list of segments. This way, when a user selects a correct path, we can remove all but the correct segment with the most information.

Figure 6:
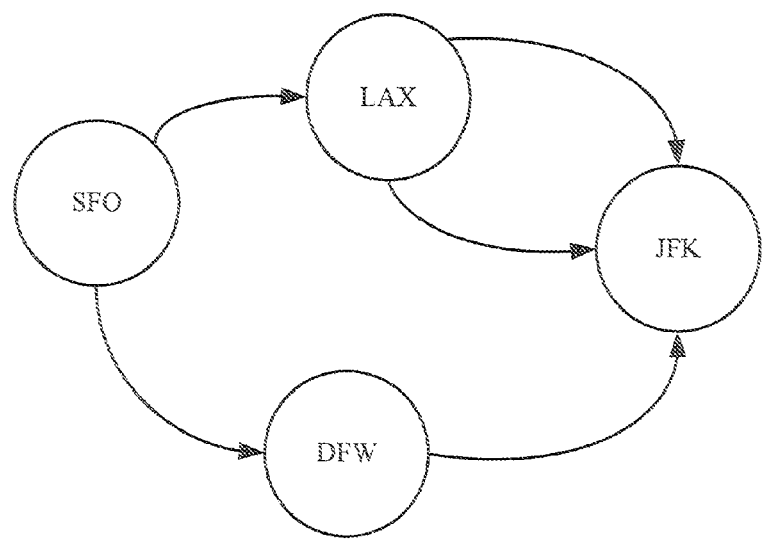

With respect to FIG. 6, we traverse the graph as set out above. The only start node is SFO, since it has no edges leading to it. From SFO, we find an edge to LAX and from there two different edges to JFK. JFK is an end node, since it has no edges leading from it. We store each of the paths traversed so far, and backtrack. The paths so far are SFO to LAX to JFK, and a different SFO to LAX to JFK. After backtracking, we follow the path from SFO through DFW to JFK and store that path also. We finally sort those paths so that the most recent is first. If we assume that the path through DFW was imported most recently, then the list of candidate paths is, in sorted order "SFO to DFW to JFK", "SFO to LAX to JFK", and "SFO to LAX to JFK". The last two paths will have different details for their respective LAX to JFK segments.

As noted above, at various points in FIGS. 8-9B we need to compare segments for identity and for information content. In particular, while sorting segments within an edge to determine the representative segment, we need to be able to compare two segments for the amount of information contained in each segment. Also, while constructing the graph and determining whether a segment should go in an existing edge or a new one, we need to be able to test whether two segments contain identical information.

Segments may contain more than just origin and destination information. They may also contain information such as start time and date, end time and date, entity information (e.g., airline, train line, bus line, etc.), travel numbers (e.g., flight numbers, train numbers, bus numbers, etc.) and other information. To define both identity and amount of information content, we may use a process such as the one explained in FIGS. 10A-10B.

Figure 10A:
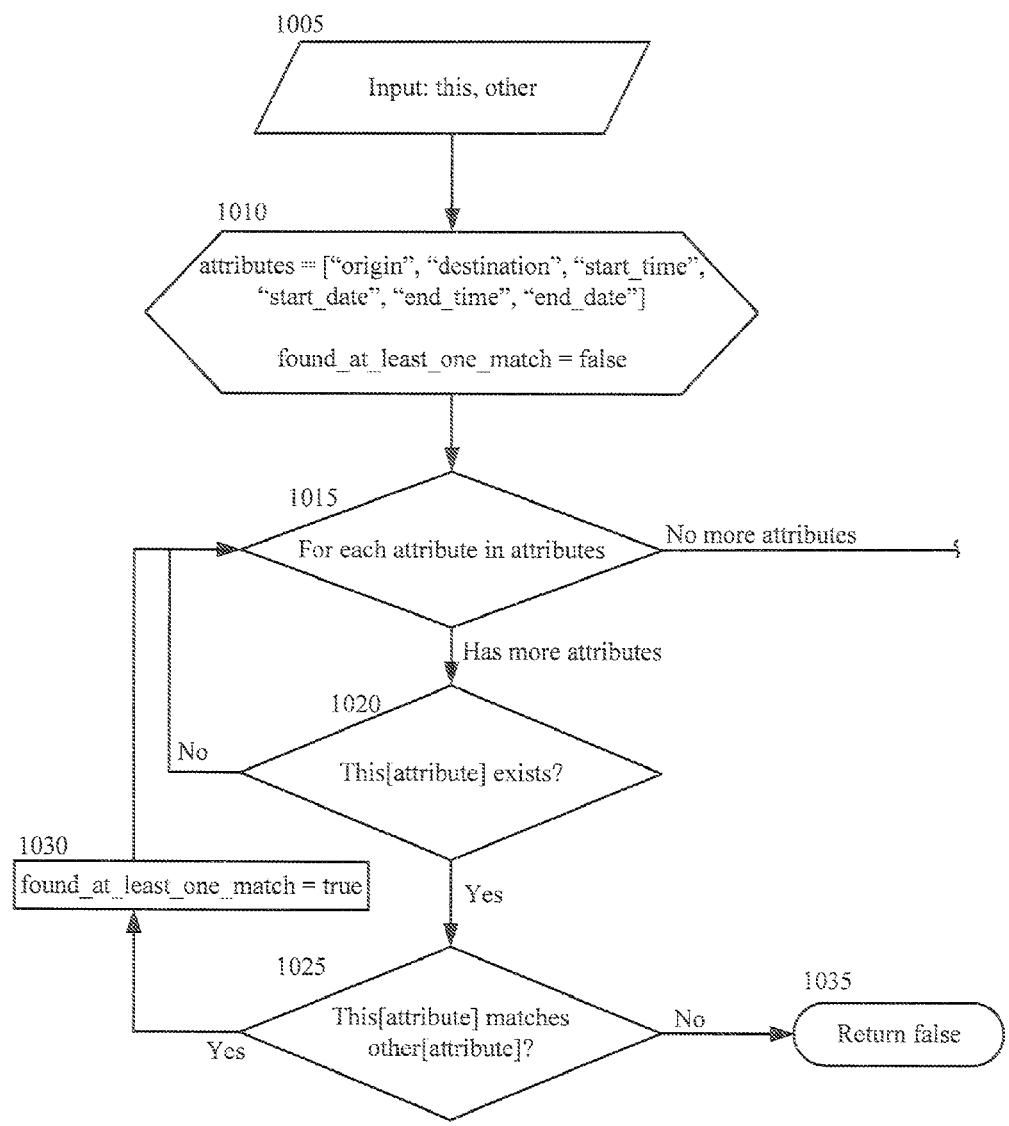
Figure 10B:
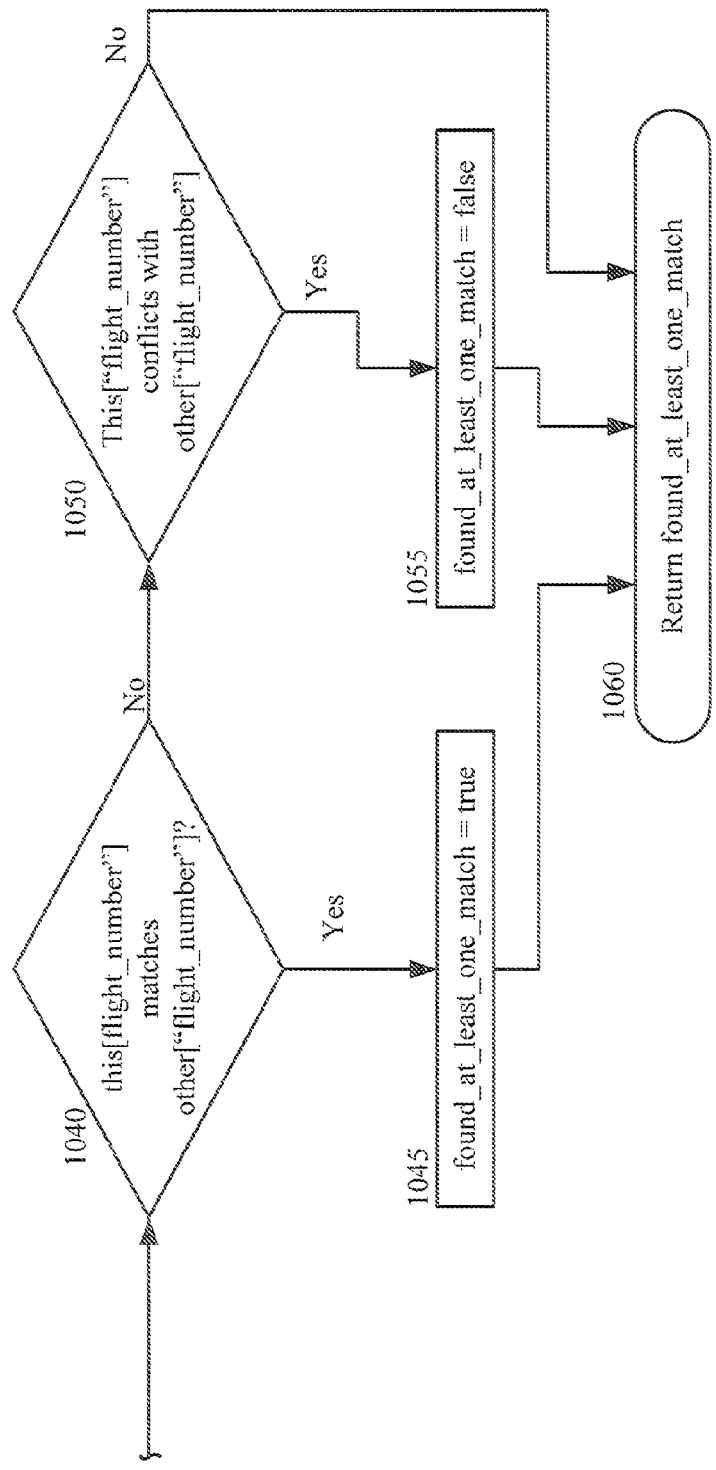

FIGS. 10A-10B illustrates a method for segment comparison, according to an embodiment. In 1005, the existing segment and the segment to compare with it are input. In 1010, the list of attributes to compare is listed. In addition, the flag that indicates whether we have found a matching attribute may be set to false. In 1015, we may interate over the attributes to compare. In 1020, if the current attribute does not have a value in the existing segment, then we may skip comparing it. In 1025, if the current attribute in the existing segment matches the value of the same attribute in the new segment, then we may remember that a match was found in 1030. In 1030, we may remember that a match was found and continue comparing the rest of the attributes. In 1035, if no match was found for a value that exists in the existing segment, we may return false, since their values are in conflict. In 1040, if the flight numbers of the two segments match, we may remember that a match was found in 1045. In 1050, if the flight numbers of the two segments conflict, then we may return "false", regardless of any other matching attributes, by setting the flag to false in 1055 to override any matches that were found. In 1060, we may return the final value of the flag. If there are any matches and no conflicts, then the result may be set as "true".

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than those shown. For example, the elements in the flowcharts may be performed in parallel or in a different order.

Further, the purpose of any Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. An Abstract of the Disclosure is not intended to be limiting as to the scope of the present invention in any way.

It should also be noted that the terms "a", "an", "the", "said", etc. signify "at least one" or "the at least one" in the application (e.g., specification, claims and drawings).

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method for detecting a likelihood that a travel path is a correct travel path of a user using possible duplicate travel path information, comprising:
    obtaining a set of travel paths comprising at least two travel paths from a travel path database in communication with at least one processor;
    at the at least one processor, removing any paths that break up more than one reservation;
    at the at least one processor, breaking each travel path into at least one leg, wherein the at least one leg comprises at least one segment, wherein the at least one segment comprises a single unit of travel with an origin and a destination;
    at the at least one processor, comparing each leg in each travel path to each leg in every other travel path in the set of travel paths to determine whether any travel paths are duplicates by determining whether any segments in any legs are similar by determining whether any segments have the same origin and/or the same destination as other segments in other legs in the set of travel paths wherein the legs are defined as computerized sequences of segment origins and destinations, and at least one computerized subsequence is utilized to find common segment origins and destinations; and
    at the at least one processor, determining a likelihood that each of the at least two travel paths is the correct travel path using information about whether any of the at least two travel paths are duplicates.

2. The method of claim 1, comprising, at the at least one processor, listing of any candidate travel paths that are possible duplicates, the listing further comprising:
    constructing at least one similar leg graph where nodes of the leg graph represent origins and destinations of legs.

3. The method of claim 1, further comprising:
    at the at least one processor, allowing the user to select the correct travel path from a list of candidate travel paths that are possible duplicates.

4. The method of claim 1, wherein possible duplicates are sorted according to which travel path information was imported into the system most recently.

5. The method of claim 3, further comprising:
    at the at least one processor, resolving any duplicate similar travel paths.

6. The method of claim 1, wherein the at least two travel paths compare: air travel, car travel, rail travel, or bus travel, or any combination thereof.

7. The method of claim 1, further comprising:
    determining whether any legs are similar to any other legs by determining whether any segments in any legs contain at least one start point and/or at least one end point.

8. The method of claim 1, further comprising:
    at the at least one processor, excluding any candidate travel path that incorporates more than zero but fewer than all possible segments from more than one reservation.

9. A system for detecting a likelihood that a travel path is a correct travel path of a user using possible duplicate travel path information, comprising:
    at least one processor configured for:
        obtaining a set of travel paths comprising at least two travel paths from a travel path database in communication with the at least one processor;
        removing any paths that break up more than one reservation;
        breaking each travel path into at least one leg, wherein the at least one leg comprises at least one segment, wherein the at least one segment comprises a single unit of travel with an origin and a destination;
        comparing each leg in each travel path to each leg in every other travel path in the set of travel paths to determine whether any travel paths are duplicates by determining whether any segments in any legs are similar by determining whether any segments have the same origin and/or the same destination as other segments in other legs in the set of travel paths wherein the legs are defined as computerized sequences of segment origins and destinations, and at least one computerized subsequence is utilized to find common segment origins and destinations; and
        determining a likelihood that each of the at least two travel paths is the correct travel path using information about whether any of the at least two travel paths are duplicates.

10. The system of claim 9, wherein the at least one processor is further configured for listing any candidate travel paths that are possible duplicates, the listing further comprising:
    constructing at least one similar leg graph where nodes of the leg graph represent origins and destinations of legs.

11. The system of claim 9, wherein the at least one processor is further configured for:
    allowing the user to select the correct travel path from a list of candidate travel paths that are possible duplicates.

12. The system of claim 9, wherein possible duplicates are sorted according to which travel path information was imported into the system most recently.

13. The method of claim 11, wherein the at least one processor is further configured for:
    resolving any duplicate similar travel paths.

14. The system of claim 9, wherein the at least two travel paths compare: air travel, car travel, rail travel, or bus travel, or any combination thereof.

15. The system of claim 9, wherein the at least one processor is further configured for:
    determining whether any legs are similar to any other legs by determining whether any segments in any legs contain at least one start point and/or at least one end point.

16. The method of claim 9, wherein the at least one processor is further configured for:
    excluding any candidate travel path that incorporates more than zero but fewer than all possible segments from more than one reservation.

* * * * *